Feb. 23, 1932. H. H. BARBER 1,846,829
CONVEYER
Filed Sept. 28, 1928
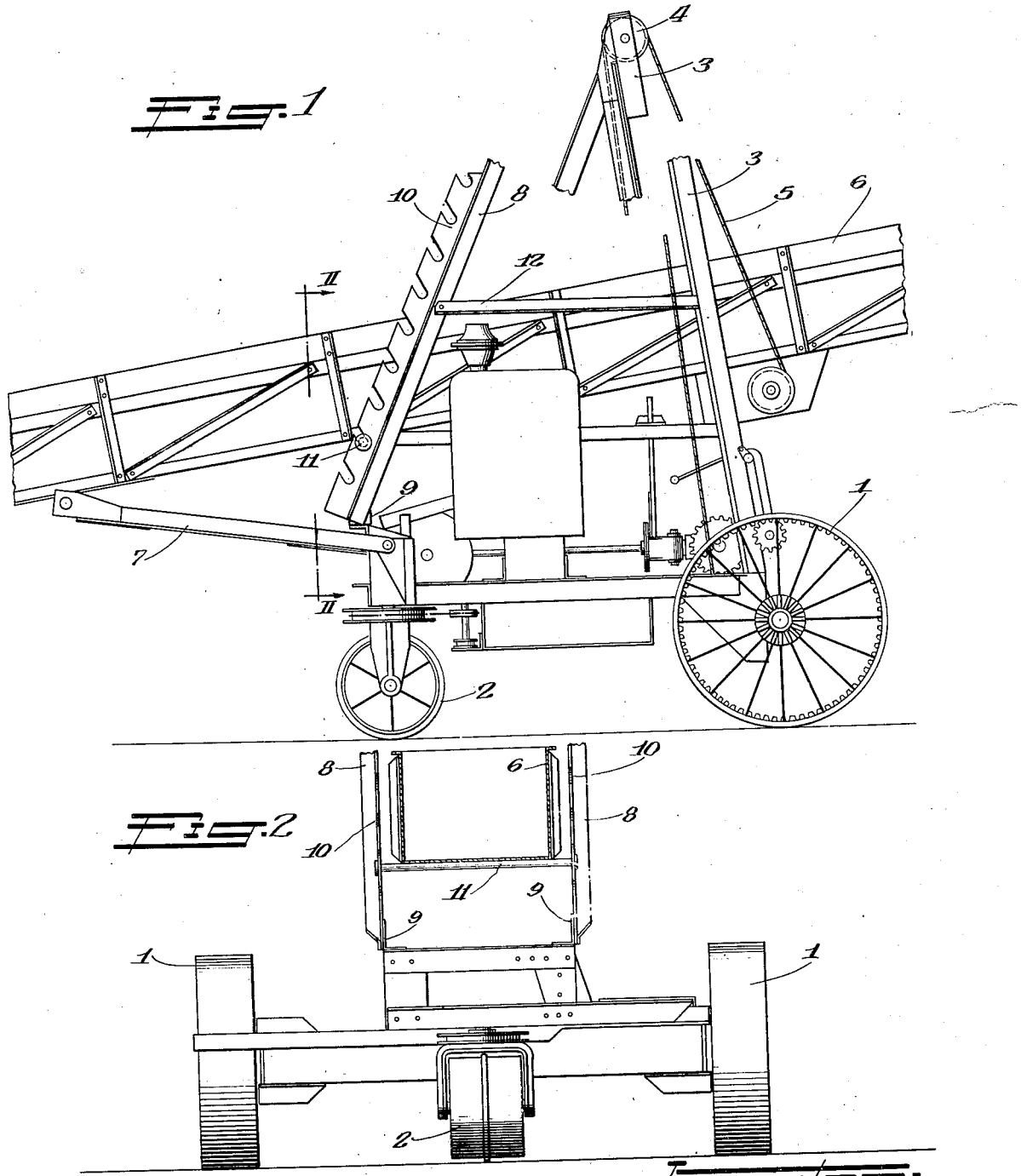
Inventor:
Harry H. Barber,
by:

Patented Feb. 23, 1932

1,846,829

UNITED STATES PATENT OFFICE

HARRY H. BARBER, OF AURORA, ILLINOIS, ASSIGNOR TO BARBER-GREENE COMPANY, A CORPORATION OF ILLINOIS

CONVEYER

Application filed September 28, 1928. Serial No. 309,011.

This invention relates to a conveyer of the portable type which is adapted to move forwardly into its work for elevating material and which generally involves a truck having a pair of rear wheels and a forward swivelled caster.

In the use of such a conveyer, the nose of the boom usually rests upon or in the pile of material being elevated, and as the conveyer is advanced and its nose is pushed into the pile of material, it frequently happens that the truck tilts and the caster is raised above the ground. This is objectionable. Further, when working in soft ground, the nose of the boom usually digs into the earth, a condition which is also objectionable.

It is an object of this invention to overcome the above noted objections in the provision of mechanism which is preferably adjustable and located at the forward end of the truck for supporting the forward end of the boom so that its nose will be maintained at a predetermined elevation.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a broken side elevational view of a conveyer involving this invention.

Figure 2 is a transverse sectional view taken upon the line II—II of Figure 1, looking in the direction of the arrows.

In the drawings there is shown a conveyer consisting of a truck supported upon a pair of rear wheels 1 and a forward caster 2 which is usually mounted to swivel. The truck supports the usual framework for the conveyer, which includes a pair of upright members 3, the upper part of which is shown in broken-off relation. A sheave 4 at the upper end of each upright support has a cable 5 trained thereover for supporting, elevating and lowering a conveyer boom 6 as is well known in the art.

The forward end of the boom 6 is pivotally connected by radius rods 7 to the front part of the truck. When the boom is sufficiently elevated so that the thrust of the radius rods is largely in a downward direction, such thrust will prevent the caster or front end of the truck from tilting upward when the nose of the boom is advanced into a pile of material. However, when the boom is operated at a shallow inclination, so that the thrust of the radius rods is in an upward direction, or in a substantially horizontal direction, or even slightly downward, there is a tendency for the caster 2 and the forward end of the boom to rise or tilt upwardly. To overcome this upward tilt, adjustable mechanism has been provided for supporting the forward end of the boom with its nose in a predetermined relation with the ground. The illustrated form of this mechanism will now be set forth.

A pair of angle bars 8 are attached at their upper ends to the uprights 3 and at their lower ends they are attached to gusset angles 9 on the frame of the truck. Each angle bar 8 supports a notched plate or member 10. The notches in the two plates register for the reception of a transverse bar or member 11 upon which the forward end of the conveyer boom is designed to rest when the same is in its lowered operative position. The vertical range of the notches is such that the transverse bar 11 can be raised or lowered to support the forward end of the boom in any ordinary adjustment. If desirable, the angle supports 8 may be braced by braces 12 attached to the uprights 3.

According to this invention, the boom is adapted to be lowered to substantially the desired inclination. The transverse bar 11 is then inserted in the first pair of notches under the boom. The boom may then be slightly lowered until it rests upon the bar 11.

It will be obvious that the bar 11 will support the boom with its nose in a predetermined relation with the ground and that as the nose thereof is forced into the pile of material, the thrust will be transmitted thru the bar 11 to the forward end of the truck and prevent any upward tilting thereof.

It will be appreciated that this secondary support 11 of the boom will also prevent the nose of such boom from sinking downwardly or digging into soft soil.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. In a conveyer, a truck having an upright mast, a boom, cable means for supporting said mast, a boom, cable means for supporting said boom upon said mast, means for operating said cable for raising and lowering said boom, a radius rod connecting the forward part of said boom and truck, a pair of upwardly extending supports upon the forward part of said truck, one upon each side of said boom, and a rod vertically adjustable upon said supports for supporting the forward end of said boom in its operative position.

2. In a conveyer, a truck, said truck having an upright mast, a boom, cable means for supporting said boom upon said mast, means for operating said cable for bodily elevating and lowering said boom, a radius rod connecting the forward end of said boom and truck, upwardly extending supports upon the forward end of said truck, said supports having vertically spaced rod engaging seats and a rod vertically adjustable with respect to said seats for supporting the forward end of said boom in its operative position.

3. In a conveyer, a truck including an upright mast, a boom, cable means upon said mast for supporting said boom, means for operating said cable for raising and lowering said boom, and an auxiliary supporting means upon the forward part of said truck including a vertically adjustable rod for engaging the boom and preventing upward tilting movement of said truck when the nose of the boom is advanced into a pile of material.

4. In a conveyer including a truck having an upright mast, a boom, cable means for supporting said boom upon said mast, a radius rod connecting the forward end of said boom and truck, and adjustable auxiliary supporting means upon the forward end of said truck including a vertically adjustable rod for supporting the nose of the boom in its operative position.

5. The combination with a vehicle, of a boom supported upon said vehicle, means for raising and lower the boom, radius rods pivotally connecting the forward portion of said boom and vehicle, and means including a transversely extending element upon said vehicle and located between said boom and vehicle and engaging said boom for arresting upward tilting movement of the front end of said vehicle when said boom is advanced into a pile of material.

6. The combination with a vehicle, of a boom, means for supporting the boom upon said vehicle for elevating and lowering movements, radius rods pivotally connecting the forward portion of said boom and vehicle, upwardly extending supports upon said vehicle and a transverse member adjustably sustained upon said supports for engaging said boom and arresting upward tilting movement of the front part of said vehicle when said boom is advanced into a pile of material.

7. In a portable conveyer comprising a vehicle, a boom supported upon said vehicle, radius rods pivotally connecting said vehicle with the forward portion of said boom and means on said vehicle below said boom and engageable therewith for arresting upward tilting movement of said vehicle when the nose of the boom is advanced into a pile of material.

In testimony whereof I have hereunto subscribed my name at Aurora, Kane County, Illinois.

HARRY H. BARBER.